United States Patent
Sawada et al.

(10) Patent No.: US 7,292,157 B2
(45) Date of Patent: Nov. 6, 2007

(54) REMOTE CONTROL SYSTEM FOR CONTROLLING INSTALLED PROGRAM

(75) Inventors: Hideyuki Sawada, Neyagawa (JP); Yuuki Ogawa, Neyagawa (JP)

(73) Assignee: Onkyo Corporation, Neyagawa-shi (JP)

( * ) Notice: Subject to any disclaimer, the term of this patent is extended or adjusted under 35 U.S.C. 154(b) by 330 days.

(21) Appl. No.: 10/799,993

(22) Filed: Mar. 12, 2004

(65) Prior Publication Data
US 2005/0044414 A1    Feb. 24, 2005

(30) Foreign Application Priority Data
May 26, 2003 (JP) .............................. 2003-147155

(51) Int. Cl.
*H04Q 1/00* (2006.01)
(52) U.S. Cl. ..................... 340/825.22; 340/825.69; 340/825.72
(58) Field of Classification Search ........... 340/825.22, 340/825.69, 825.72; 341/176; 398/106; 726/4; 700/83
See application file for complete search history.

(56) References Cited

U.S. PATENT DOCUMENTS

| | | | |
|---|---|---|---|
| 5,386,251 A * | 1/1995 | Movshovich | 348/734 |
| 5,650,831 A * | 7/1997 | Farwell | 348/734 |
| 5,856,789 A * | 1/1999 | Huang | 713/300 |
| 6,097,520 A * | 8/2000 | Kadnier | 398/106 |
| 6,212,439 B1 * | 4/2001 | Cha | 700/83 |
| 6,690,392 B1 * | 2/2004 | Wugoski | 715/744 |
| 7,005,966 B1 * | 2/2006 | Leman et al. | 340/10.4 |

FOREIGN PATENT DOCUMENTS

| | | |
|---|---|---|
| JP | 07-283850 | 10/1995 |
| JP | 2002-049448 | 2/2002 |
| JP | 2002-152860 | 5/2002 |

\* cited by examiner

*Primary Examiner*—Edwin C. Holloway, III
(74) *Attorney, Agent, or Firm*—Renner, Otto, Boisselle & Sklar, LLP (57) ABSTRACT

A remote control system includes a computer and a receiver, and allows the user to control the operation of a computer program installed in the computer. The receiver receives an infrared ray signal transmitted from a remote controller and decodes the signal to a remote code. The remote code is transmitted to the computer. The computer registers the remote code in a registration table in association with the operation of the computer program selected by the user. The computer executes the operation of the computer program corresponding to the registered remote code when the receiver receives the signal for the registered remote code.

12 Claims, 12 Drawing Sheets

THE BUTTON HAS ALREADY BEEN REGISTERED.
MULTI-OPERATION REGISTRATION?

YES    NO

REMOTE CONTROL SYSTEM FOR CONTROLLING INSTALLED PROGRAM

BACKGROUND OF THE INVENTION

1. Field of the Invention

The present invention relates to a remote control system, and, more specifically, to a remote control system that allows the user to control the operation of an installed computer program using a remote controller.

2. Description of the Related Art

The operation of conventional AV (Audio Visual) equipment such as a TV and a CD player can be controlled using a remote controller. Meanwhile, as broad band networks have spread and computers have been developed, people can now listen to music or view video images with a computer. Therefore, some recent computers have a dedicated remote controller for a music or video image reproducing program.

However, the conventional remote controller is dedicated to a computer program only. Therefore, the user cannot operate the program (such as an operating system and an application program) by using a remote controller dedicated to other computer program.

In a computer program with the dedicated remote controller, an operation of the remote controller is preset, in other words, the user cannot change the setting as desired. Therefore, the user has to operate different dedicated remote controllers for a number of different computer programs, which is cumbersome.

Recently, TV programs or radio programs have their own web pages on the Internet. When the user wants to watch a TV program while viewing the web page of the program, the user must operate the TV and the browser separately, which is cumbersome as well.

SUMMARY OF THE INVENTION

It is an object of the invention to provide a remote control system that allows the user to control the operation of a computer program using a remote controller of any kind.

A remote control system according to the invention allows the user to operate a computer program using a remote controller. The system includes a receiver, a register, and an executer. The receiver receives a signal from the remote controller and decodes the signal to a remote code. The register registers the remote code and a selected operation of the computer program installed in a computer in a registration table. The operation is corresponding to the remote code. The executer executes the operation of the computer program corresponding to the registered remote code when the receiver receives the signal for the registered remote code.

In the remote control system according to the invention, a signal transmitted from the remote controller is received and decoded to a remote code, and the remote code is registered in the registration table in association with the operation of the computer program. When a signal for the registered remote code is received, the operation of the program corresponding to the remote code is executed. Therefore, the operation of the program can be controlled using for example a remote controller for AV equipment. One operation of the program may be registered for one remote code, or a plurality of operations of the program may be registered for one remote code.

Preferably, the register registers a message corresponding to the remote code in the registration table. The remote control system further includes a display. The display displays the message corresponding to the remote code when the executer executes the operation of the computer program.

In this way, the user inputs the operation of the program corresponding to the remote code as a message. Therefore, the user can confirm on the display which operation is executed upon operation of the remote controller.

Preferably, the register registers continuation information corresponding to the operation of the computer program in the registration table. The continuation information indicates whether or not to continue to execute the selected operation of the computer program. When the continuation information indicates the continuous execution, while the receiver receives the signal, the executer continues to execute the operation of the computer program corresponding to the remote code decoded from the received signal.

In this way, when the volume of music software is raised/lowered for example, the volume continues to be increased/lowered as long as the user presses a corresponding button in the remote controller.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Now, an embodiment of the invention will be described in conjunction with the accompanying drawings in which the same or corresponding portions are denoted by the same reference characters and their descriptions apply likewise.

General Configuration of Remote Control System

Figure 1:
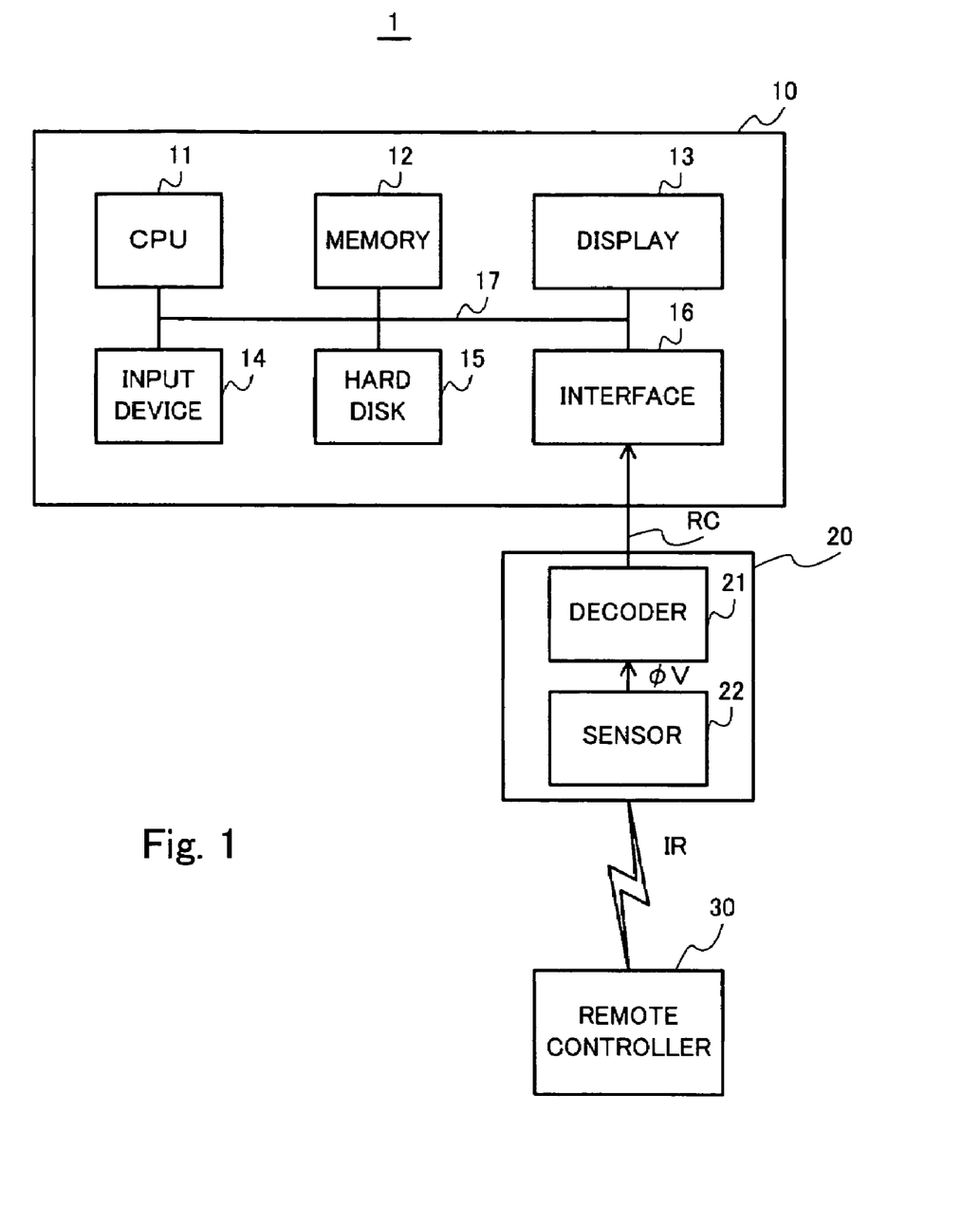
FIG. 1 is a functional block diagram of the general configuration of a remote control system according to an embodiment of the invention.

Referring to FIG. 1, a remote control system 1 includes a computer 10 and a receiver 20. The receiver 20 includes a decoder 21 and a sensor 22. The sensor 22 generates a remote signal φV in response to an infrared ray signal IR transmitted from a remote controller 30. The decoder 21 decodes the remote signal φV to a remote code RC specific to the infrared ray signal IR. The remote controller 30 may be any remote controller, for example, the remote controller for AV or audio equipment.

The computer 10 includes a central processing unit (CPU) 11, a memory 12, a display 13, an input device 14 such as a keyboard and a mouse, a hard disk 15, and an interface 16. These are connected with each other through a bus 17. The receiver 20 is connected to the interface 16, and the decoder 21 transmits the remote code RC to the computer 10.

The memory 12 or the hard disk 15 stores a registration table. The originally stored registration table has no content. All the contents shown in Table 1 will be registered by the user.

TABLE 1

Registration Table

| Reg ID | Remote Code | Operation | | | | Display Image | |
|---|---|---|---|---|---|---|---|
| | | Kind | File Name | Operation ID | Continuation Information | Display Content | Display |
| 1 | 2D0012 | P | | 2 | 0 | Shutting Down | 1 |
| 2 | 2D1234 | F | C¥best web¥service.url | 1 | 0 | | 0 |
| 3 | ABCD99 | W | Music PLAYER | 577 | 1 | Raise Volume | 1 |
| 4 | 123582 | F | C¥best web¥maker1.url | 1 | 0 | | 0 |
| | | F | C¥best web¥maker2.url | 1 | 0 | | 0 |
| | | F | C¥best web¥meker3.url | 1 | 0 | | 0 |
| 5 | FF0012 | W | Music Editor | 235 | 0 | Reproduce | 1 |
| 6 | TH0125 | F | http://www.abc.com/internetradio.url | 1 | 0 | Internet Radio | 1 |
| 7 | ... | ... | ... | ... | ... | ... | ... |

Referring to Table 1, the registration table has columns for registration IDs, remote codes, operations, and display images on the screen. The registration ID column has registration IDs for remote codes RC registered in the registration table. Remote codes RC are recorded in the remote code column. The operation column has the contents of operations registered for the remote codes RC. The operation column is divided into columns for kinds, file names, operation IDs, and continuation information.

The kind column has the kinds of operations of a computer program to be controlled by the remote controller 30. When the operation of the program desired to be registered in the registration table has already been registered in a presetting operation table that will be described, "P" is entered in the kind column. The operation is for example the operation that has been registered in the presetting table such as the shutting down, rebooting, and standing by of the OS.

When the operation of the program to be registered in the registration table is to open an associated file or allow the user to select an application program for opening the associated file, "F" is entered in the kind column. When the operation of the program to be registered in the registration table is the operation of the activated program, "W" is entered in the kind column. The operation is for example the operation of the activated music reproducing program such as "reproduction" and "stopping." In this case, the registered remote code RC serves as a shortcut key.

When "F" is in the kind column, a desired data resource such as a file path to a file and an Internet address of a web page is entered in the file name column. When, for example, the browser is activated and an Internet web page of interest is viewed, the Internet address of the web page is entered in the file name column.

When "W" is in the kind column, an identifier to specify the activated program to be registered is entered in the file name column. For example, when the program activated by the OS is displayed in a window on the screen of the display 13, the class name to specify the window of the activated program is entered in the file name column.

Operation IDs to specify operations to be registered for remote codes are entered in the operation ID column. The operation ID varies depending on the kinds P, F and W entered in the kind column. The operation IDs for the kind P are entered in a presetting operation table as shown in Table 2. The operation IDs for the kind F are entered in a file operation table as shown in Table 3. The operation IDs for the kind W are entered in a shortcut key operation table as shown in Table 4.

TABLE 2

Presetting Operation Table

| Kind | Operation ID | Operation |
|---|---|---|
| P | 1 | Log Off |
| | 2 | Shut Down |
| | 3 | Reboot |
| | 4 | Stand-by |
| | ... | ... |

TABLE 3

File Operation Table

| Kind | Operation ID | Operation |
|---|---|---|
| F | 1 | Open File |
| | 2 | Select Application Program |
| | ... | ... |

TABLE 4

Shortcut Key Operation Table

| Kind | Operation ID | Key Operation |
|---|---|---|
| W | 1 | "Ctrl"key + "C"key |
|  | 2 | "Enter"key |
|  | ... | ... |
|  | 235 | "A"key |
|  | ... | ... |
|  | 577 | "Shift"key + "F1"key |
|  | ... | ... |

Table 2 is an example of the presetting operation table. The presetting operation table indicates operation IDs that can be registered when "P" is entered in the kind column, and there are tables as many as the programs whose operations have been registered. For example, when the operations of both the OS and the browser are registered, there are two presetting operation tables. When the operation of the application program is pre-registered, there is a presetting operation table for the application program as well. The presetting operation table for the operation of the OS stores operation IDs for various operations by the OS such as logging off and shutting down. The operation IDs registered in the plurality of presetting operation tables are all different. For example, when operation IDs in the presetting operation table for the OS are designated 1 to 10, operation IDs in the presetting operation table for the browser are designated 11 to 20. The operation of the keyboard or mouse in the input device 14 may be registered in a presetting operation table.

The file operation table as shown in Table 3 is a table of operation IDs that can be registered when "F" is entered in the kind column. In the file operation table, 1 is for "open file" (operation ID=1), and 2 is for "select application program" (operation ID=2). The "open file" refers to the operation of activating the application program associated with the file based on its extension and opening the file. The "select application program" refers to the operation of allowing the user to select the application program for opening the file regardless of its extension.

The shortcut key operation table as shown in Table 4 stores operation IDs for operations at the input device 14. When the input device 14 is a keyboard for example, the operation IDs are registered for key operations and combinations of key operations. The operation ID for operating the key "A" in the keyboard is 235 (operation ID=235), while the operation ID for operating both the control key and the key "C" simultaneously is 1 (operation ID=1).

The operations and operation IDs to be registered to the presetting operation table, the file operation table, and the shortcut key operation table may be increased/reduced or changed by the user.

Referring back to the registration table shown in Table 1, the continuation information column has continuation information for determining whether or not to continue an operation in the operation ID column when receiving a remote code RC in the remote code column (when for example the user continues to press a button in the remote controller 30). When "1" is entered in the continuation information column, the operation under the operation ID is continued as long as the remote code RC is received. When for example the user wants to continuously increase the sound volume using the music reproduction program, the continuation information "1" is entered in the continuation information column. When the continuation information "0" is entered, the operation under the operation ID is carried out only once while the remote code RC is received.

The display image column is used to display a message at the display 13 when an operation under an operation ID is carried out. The display image column includes a display content column and a display column. The message to be displayed at the display 13 is entered in the display content column. The message is input from the input device 14 by the user. When for example an infrared ray signal IR whose remote code RC is "2D0012" in Table 1 is received, "shutting down" is displayed at the display 13. The display column is used to determine whether or not to display the message. When "1" is entered in the display column, the message is displayed at the display 13. When "0" is in the display column, no message is displayed at the display 13. When there is no message in the display content column, "0" is entered in the display column. Even though there is a message, the user may enter "0" in the display column. As described above, the user may input a message. Alternatively, the user or computer 10 may select a pre-registered message.

A remote control program is installed in the computer 10, so that the remote control system 1 carries out remote control setting processing and remote control operation processing.

Remote Control Setting Processing

Figure 2:
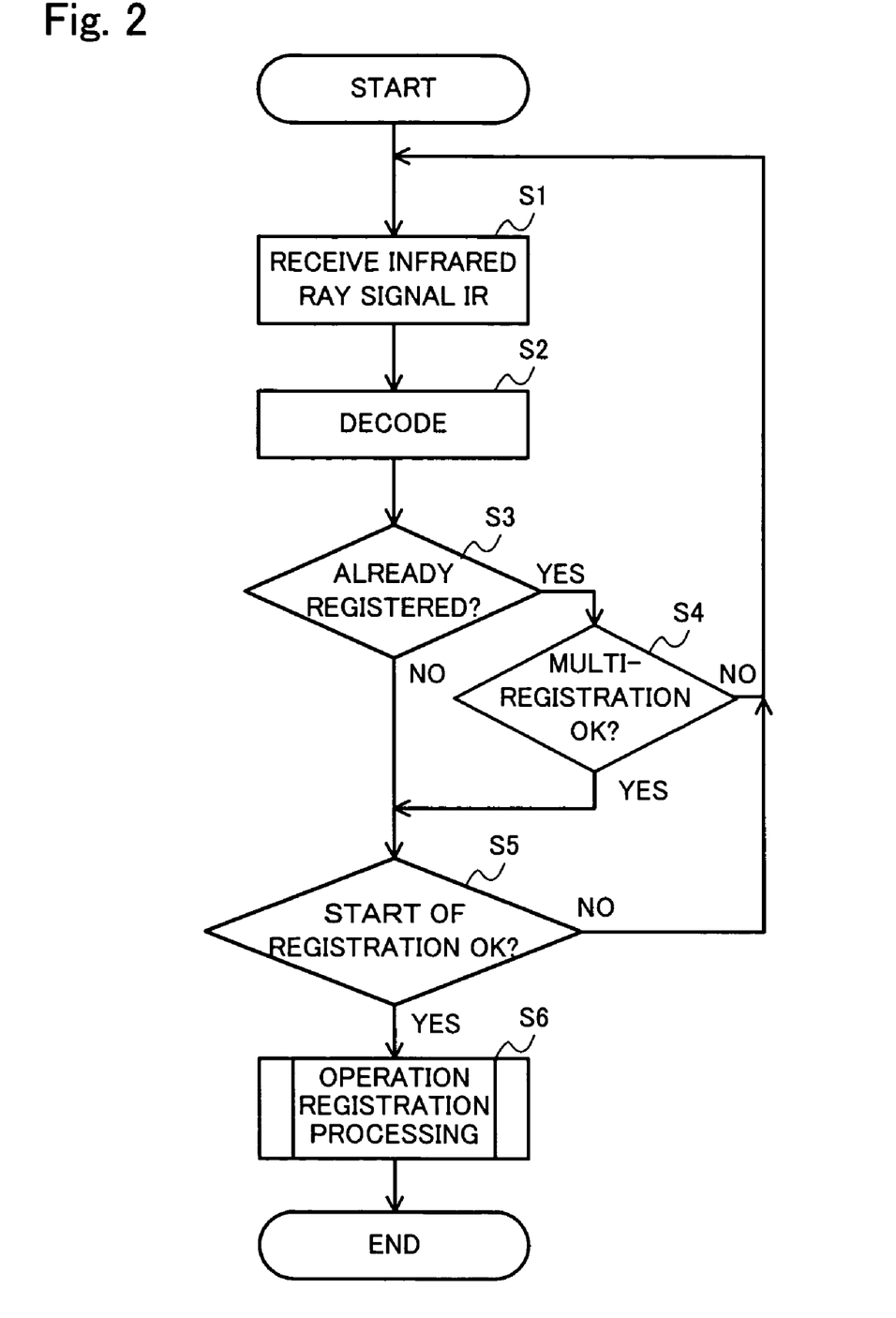
FIG. 2 is a flowchart for use in illustration of registration processing by the remote control system shown in FIG. 1.

Referring to FIG. 2, the receiver 20 receives an infrared ray signal IR from the remote controller 30 at the sensor 22 (S1). The remote controller 30 may be for TV or audio equipment. The sensor 22 converts the infrared ray signal IR into a remote signal φV and transmits the signal φV to the decoder 21. The decoder 21 decodes the received remote signal φV into a remote code RC (S2). The remote code RC corresponding to the infrared ray signal IR is transmitted to the computer 10 through the interface 16.

The computer 10 determines whether or not the remote code RC has already been registered (S3). More specifically, the computer 10 refers to the registration table stored in the memory 12 or the hard disk 15 in order to determine whether or not the remote code RC transmitted from the decoder 21 has already been registered in the registration table. If the code has not yet been registered, the computer 10 asks the user whether or not to start registration of operation for the remote code RC (S5). If the user selects the starting of the registration, the computer 10 starts processing of the registration (S6).

Figure 3:
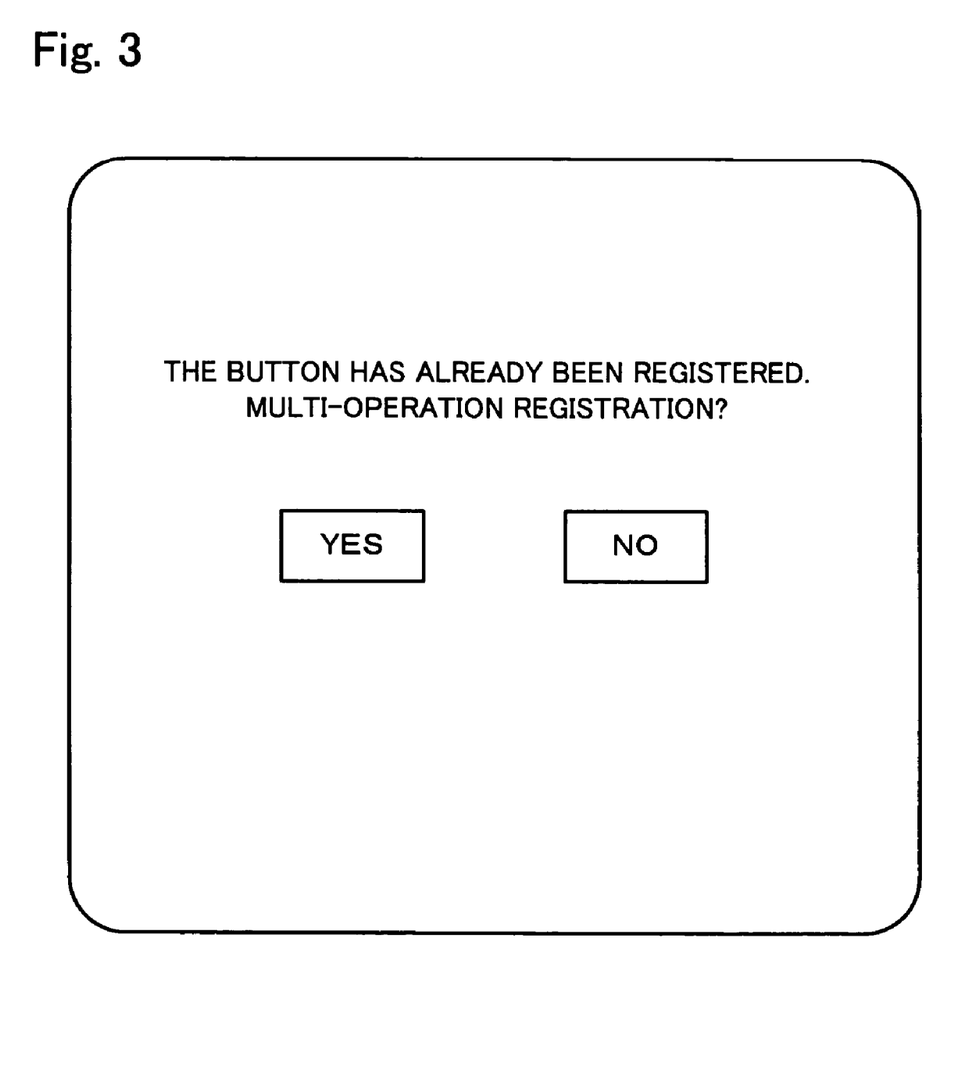
FIG. 3 is a view of an image displayed at the screen of a display for a computer in step S4 in FIG. 2.

Meanwhile, based on the result of determination in step S3, if the remote code RC has already been registered in the registration table, the computer 10 asks the user whether or not to register another operation for the remote code RC (S4). Specifically, the computer 10 displays the screen image as shown in FIG. 3 at the display 13, and asks the user whether or not to register multiple operations for the single remote code RC. When the user does not desire the registration of multiple operations and selects "NO" in the screen image in FIG. 3, the remote control system 1 returns to step S1, and restarts the remote control setting processing from the beginning.

Meanwhile, if the user selects "YES" in step S4 in the screen image in FIG. 3, the computer 10 asks the user whether or not to start the registration of operation(S5). If the user selects the starting of the registration, the computer 10 starts processing of the registration (S6). In order to view a plurality of web pages at a time by operating the remote controller 30, for example, a plurality of program operations are registered for a single remote code RC. Now, the operation registration processing in step S6 will be described.

Figure 4:
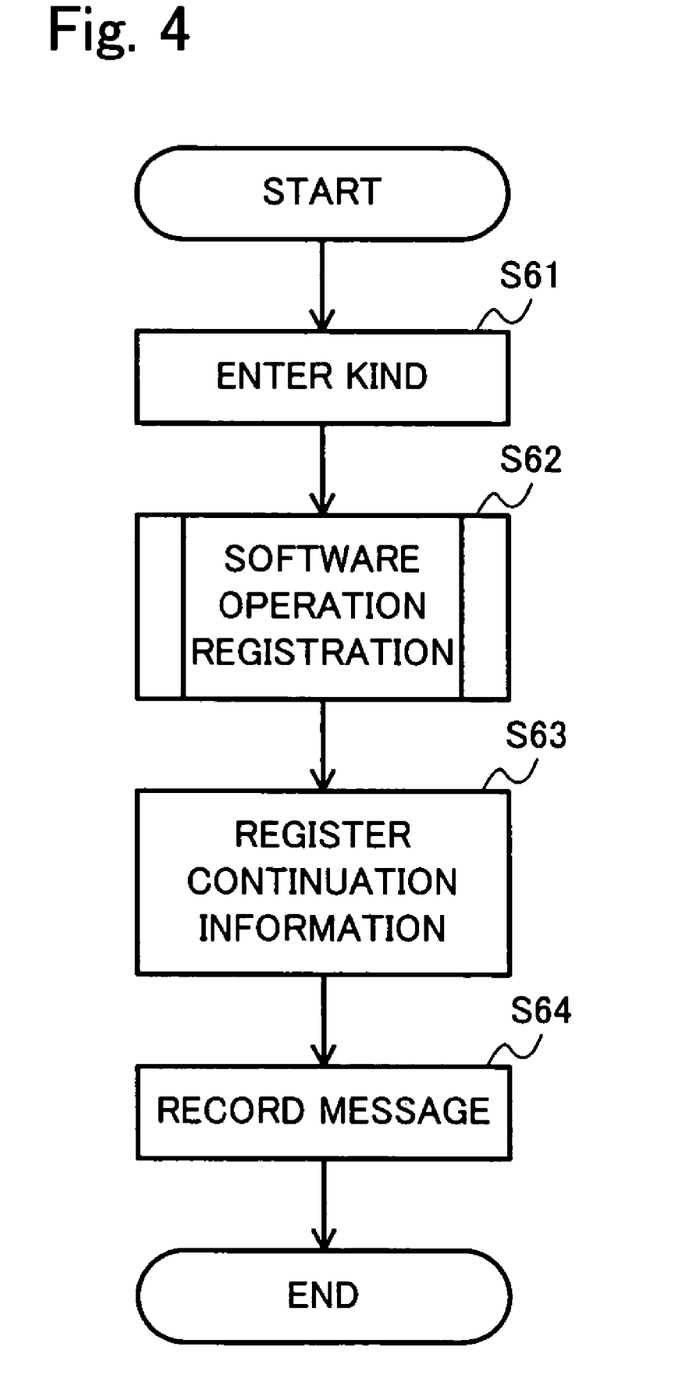
FIG. 4 is a flowchart for use in illustration of the operation in step S6 in FIG. 2.
Figure 5:
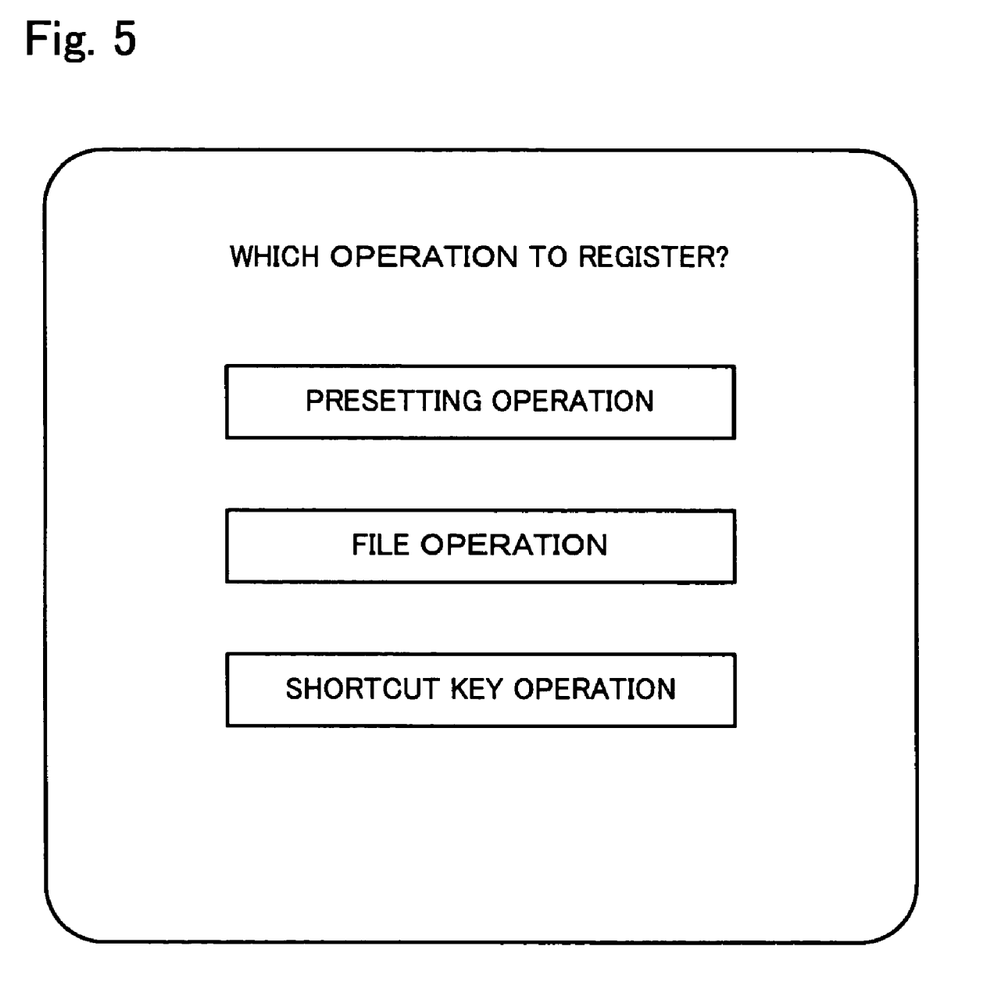
FIG. 5 is a view of an image displayed at the screen of the display for the computer in step S61 in FIG. 4.

In the operation registration processing in step S6, the computer 10 registers the operation of the program in the registration table in association with the remote code RC. Referring to FIG. 4, the computer 10 enters the kind of the operation of the program to be registered in association with the remote code RC in the registration table (S61). In step S61, the screen image shown in FIG. 5 is displayed at the display 13. Referring to FIG. 5, the user first selects the kind of operation of the program to be registered. The computer 10 registers the program operation in the registration table based on the kind selected in step S61 (S62).

Figure 6:
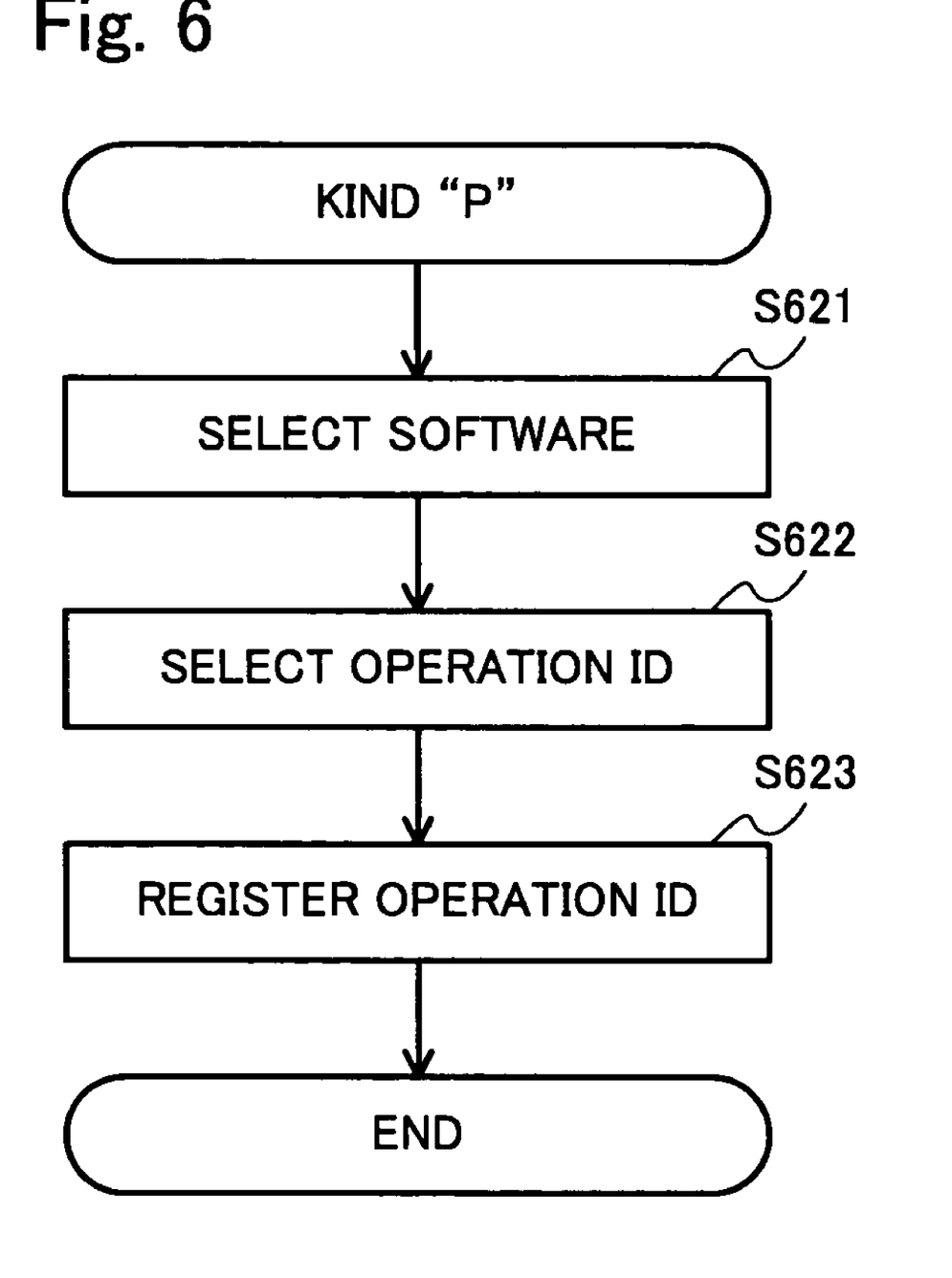
FIG. 6 is a flowchart for use in illustration of the operation in step S62 in detail when presetting operation is selected in step S61 in FIG. 4.
Figure 7:
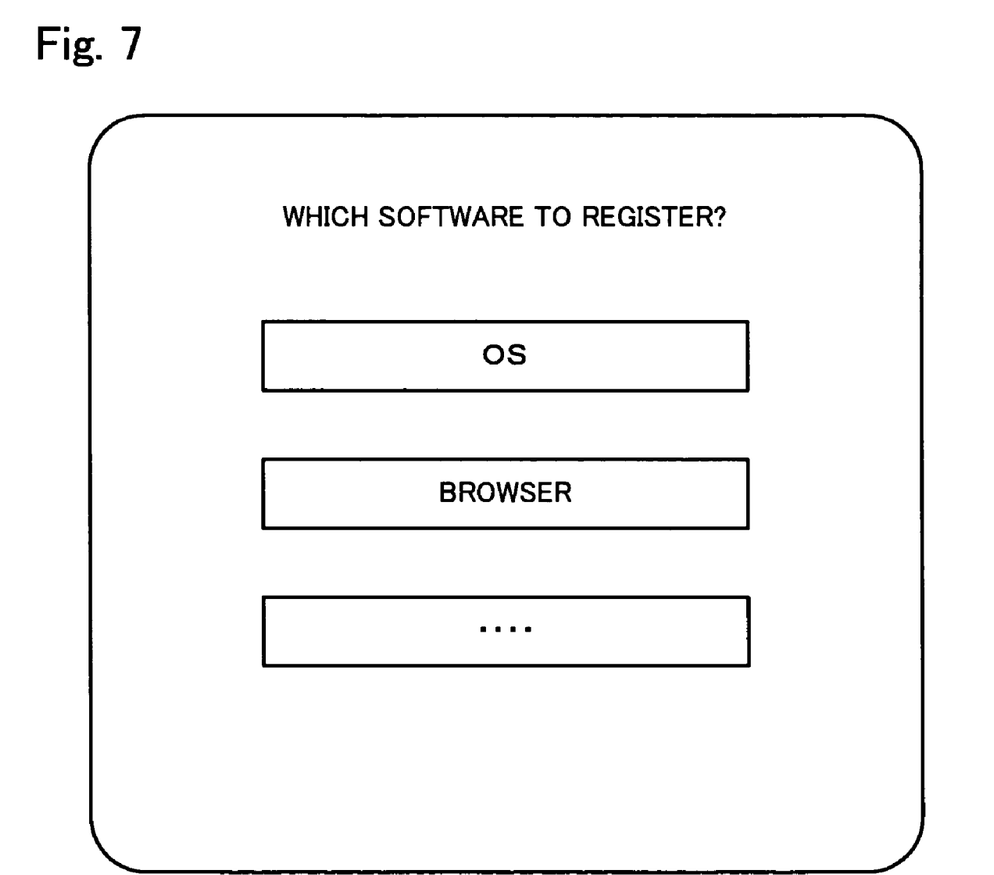
FIG. 7 is a view of an image displayed at the screen of the display for the computer in step S621 in FIG. 6.
Figure 8:
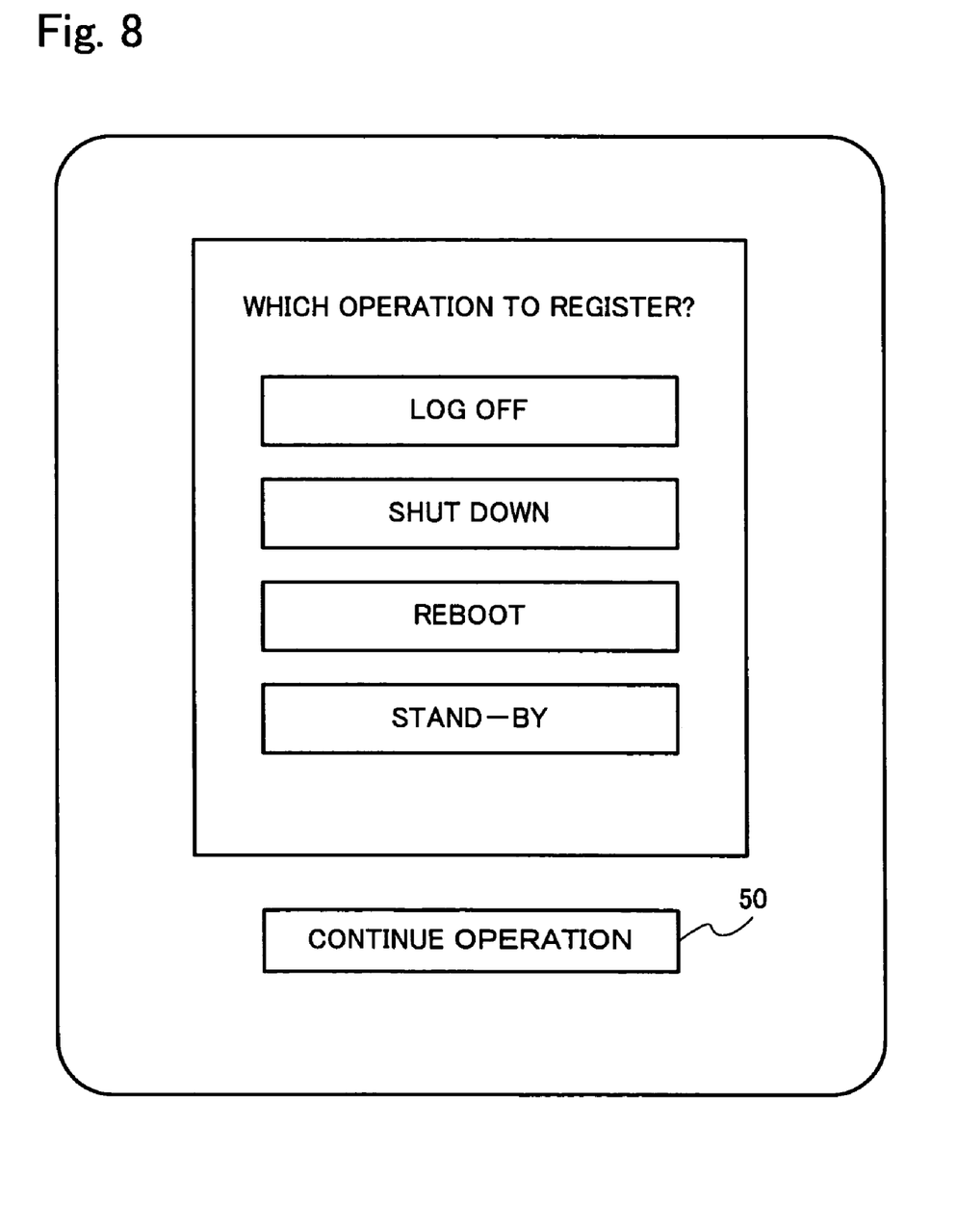
FIG. 8 is a view of an image displayed at the screen of the display for the computer in step S622 in FIG. 6.

If the user selects the "presetting operation", "P" is entered in the kind column in the registration table (S61). Referring to FIG. 6, the computer 10 asks the user to select the program to be registered (S621). The display 13 shows, as shown in FIG. 7, a plurality of programs having the already registered presetting operation tables. If the user selects "OS," the display 13 shows, as shown in FIG. 8, a plurality of operations registered in the presetting operation table. The user selects one of the operations (S622). When the user desires to register "shutting down," the "shutting down" button in FIG. 8 is selected. Since the operation ID corresponding to the "shutting down" in the presetting operation table is "2," "2" is entered in the operation ID column in the registration table (S623). If another program (such as a browser) is selected in FIG. 7, the operations of the selected program are displayed at the screen image in FIG. 8, and the user selects an operation desired to be registered.

Figure 9:
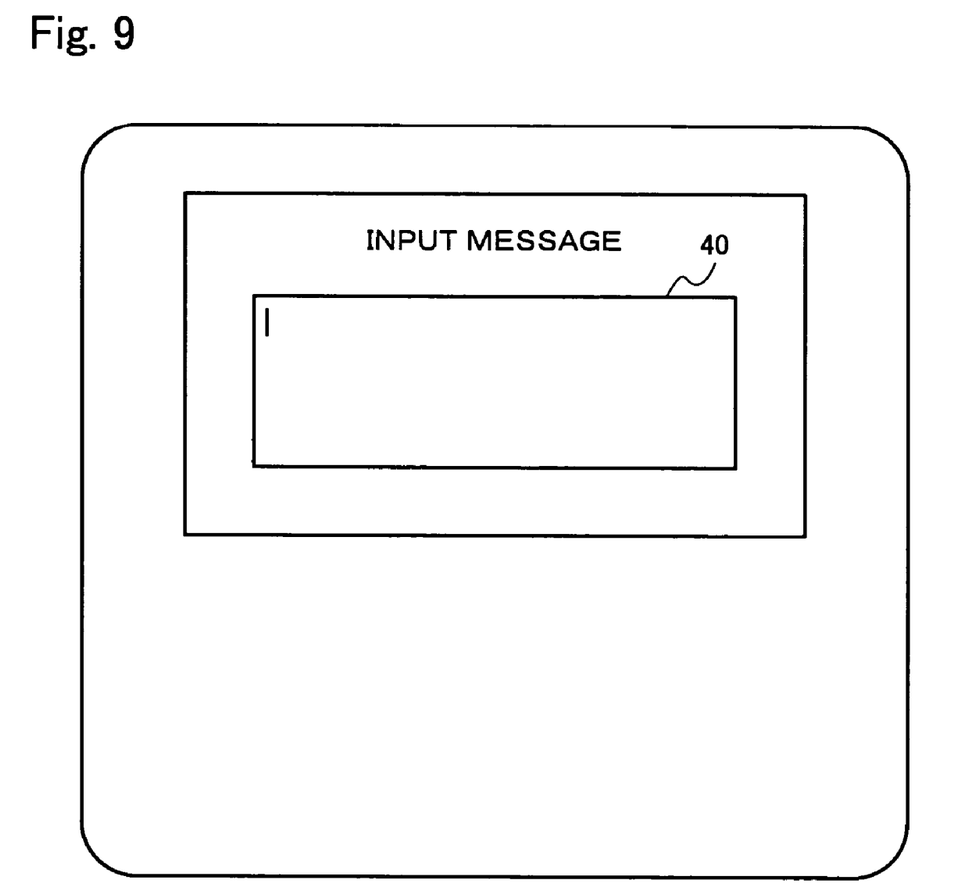
FIG. 9 is a view of an image displayed at the screen of the display for the computer in step S64 in FIG. 4.

After the above operation, the computer 10 registers continuation information (S63), and records a message in the display content column in the registration table (S64). The registration of the continuation information will later be described. In step S64, the image as shown in FIG. 9 is displayed at the display 13. When the user operates the remote controller 30 and desires to display a message at the display 13, the user inputs the desired message in the box 40 in FIG. 9. When the user inputs "shutting down" in the box 40, the message is entered in the display content column in the registration table. When the message is input to the box 40, the display column in the registration table shows "1." Note however that even after the message is input in the box 40, the user can change the display column to show "0." By the above operation registration processing, the registered content is entered in the registration table for example as information for the registration ID=1.

Figure 10:
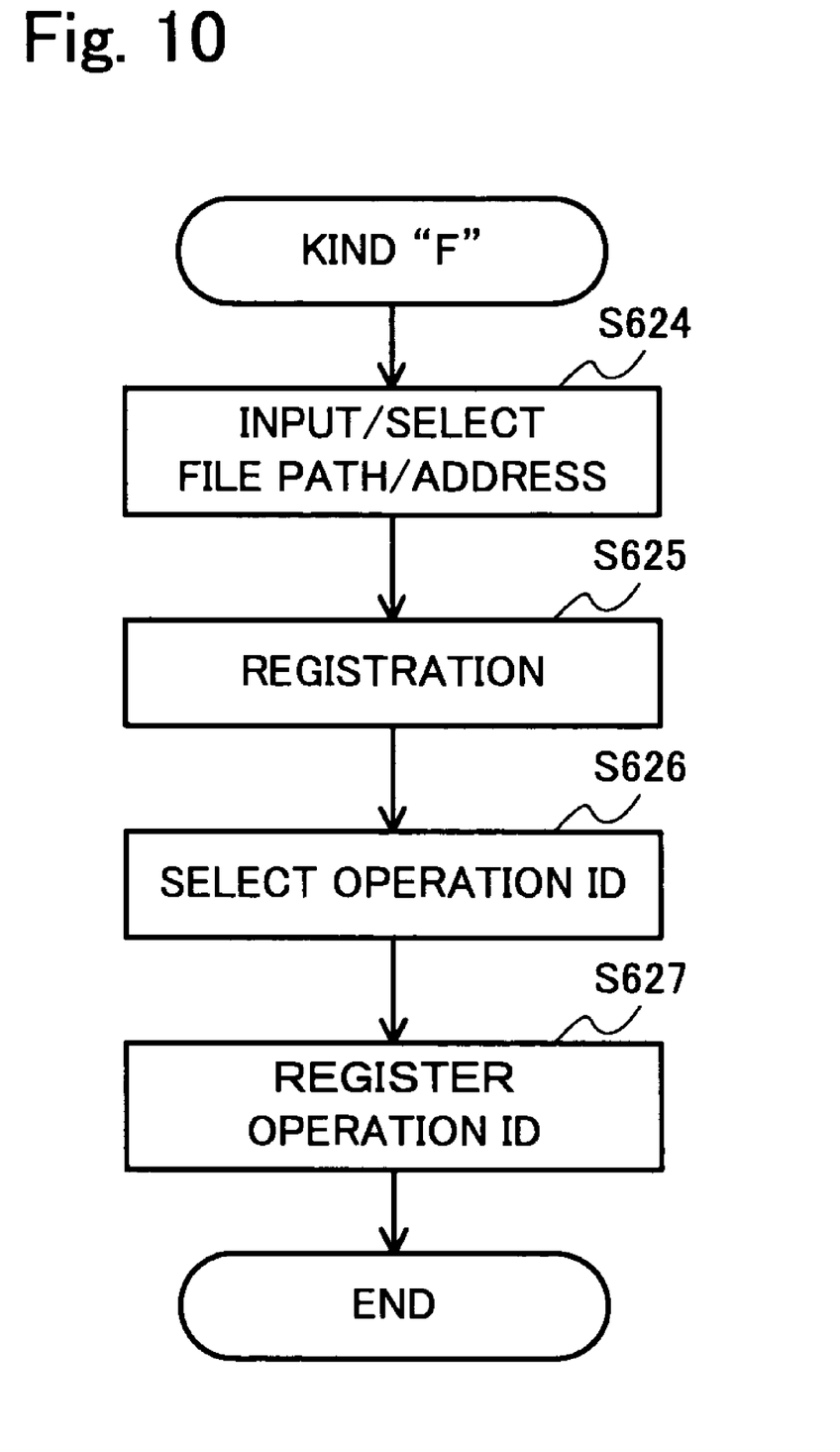
FIG. 10 is a flowchart for use in illustration of the operation in step S62 in detail when file operation is selected in step S61 in FIG. 4.

When the user selects "file operation" in step S61, "F" is entered in the kind column in the registration table. Referring to FIG. 10, the user identifies desired data resources. Specifically, the user inputs or selects the file path of a desired file or the address of a web page of interest (S624). When for example the user desires to record the operation of activating a browser and opening a desired web page for a remote code "2D1234," the user inputs the address of the desired web page to the computer 10 using the input device 14. The addresses of a plurality of web pages may be displayed at the display 13, so that the user may select the address of the desired web page among the addresses. The file path or address input or selected is registered in the file name column in the registration table (S625).

Now, the user selects an operation to be registered referring to the file operation table (S626). The display 13 displays a screen image similar to the image shown in FIG. 8, and the boxes show the operation recorded in the file operation table such as "open file" and "select application program." The user refers to the screen image, and selects the box of an operation desired to be registered. The operation ID of the selected operation is registered in the registration table (S627). When for example the user selects "open file," the operation ID for "open file" in the file operation table is "1," and therefore "1" is entered in the operation ID column in the registration table. Note that once the address of the web page is recorded in the file name column, the operation ID registered in the operation ID column is 1, i.e., ID=1 ("open file"), and a corresponding remote code RC is received, the computer 10 activates the browser and displays the web page. The subsequent operation is the same as that when the user selects the "OS operation" in step S61. The content registered by the above described operation registration is registered in the registration table for example as information for the registration ID=2.

Figure 11:
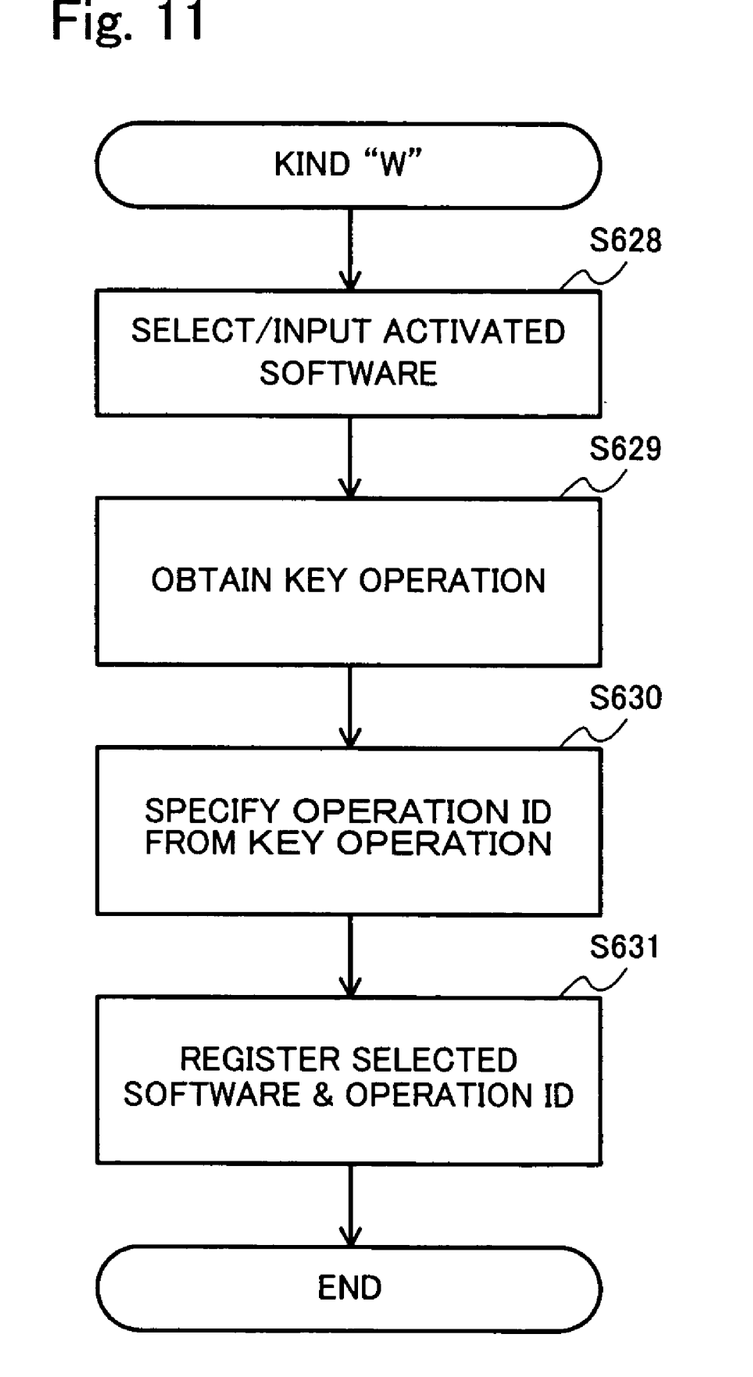
FIG. 11 is a flowchart for use in illustration of the operation in detail in step S62 when shortcut key operation is selected in step S61 in FIG. 4.

If the user selects "shortcut key operation" in step S61, "W" is registered in the kind column in the registration table. Referring to FIG. 11, the activated program whose operation is to be registered is selected or its identifier is input (S628). More specifically, a plurality of activated programs are displayed in a plurality of windows at the display 13, the user selects one of them and the class name of the window (program) is selected for the file name column in the registration table. Then, the user selects a key operation desired to be registered among the plurality of key operations in the shortcut key operation table (S629, S630). More specifically, the user operates keys in the keyboard as the input device 14, so that the computer 10 obtains the key operation (S629). All the key combinations (key operations) of the keyboard are registered in the shortcut key operation table. The computer 10 refers to the shortcut key operation table and specifies an operation ID from the obtained key operation (S630). When for example the user registers the operation of raising the sound volume by the activated music reproduction program, the user uses the keyboard serving as the input device 14 and carries out the key operation of raising the volume by the music reproducing program. When the volume raising key operation is carried out by the combination of the shift key and the key "F1" on the keyboard, the user presses the shift key and the "F1" key at a time, and the computer 10 obtains the key operation. The computer 10 specifies an operation ID "577" corresponding to the key operation of pressing the shift key and the "F1" key at a time in the shortcut key operation table. The computer 10 registers the class name input or selected in step S628 in the file name column in the registration table and the operation ID "577" in the operation ID column in the registration table (S631).

Then, if the user desires to continue to raise the volume while a remote code RC is received, the user selects "1" for the continuation information (S63). More specifically, the user selects the button 50 in FIG. 8. When the button 50 is selected, "1" is entered in the continuation information column in the registration table. Otherwise, "0" is entered in the continuation information column. The operation in step S64 is the same as that when the user selects the "presetting operation" in step S61. By the above operation registration processing, the content registered is recorded for example for registration ID=3 in the registration table.

When the operation registration processing in step S6 is carried out after multiple registration is selected in step S4, information for the registration ID=4 is for example registered in the registration table. More specifically, a plurality of operations are registered in the operation column for the remote code "123582."

Remote Control Operation Processing

Figure 12:
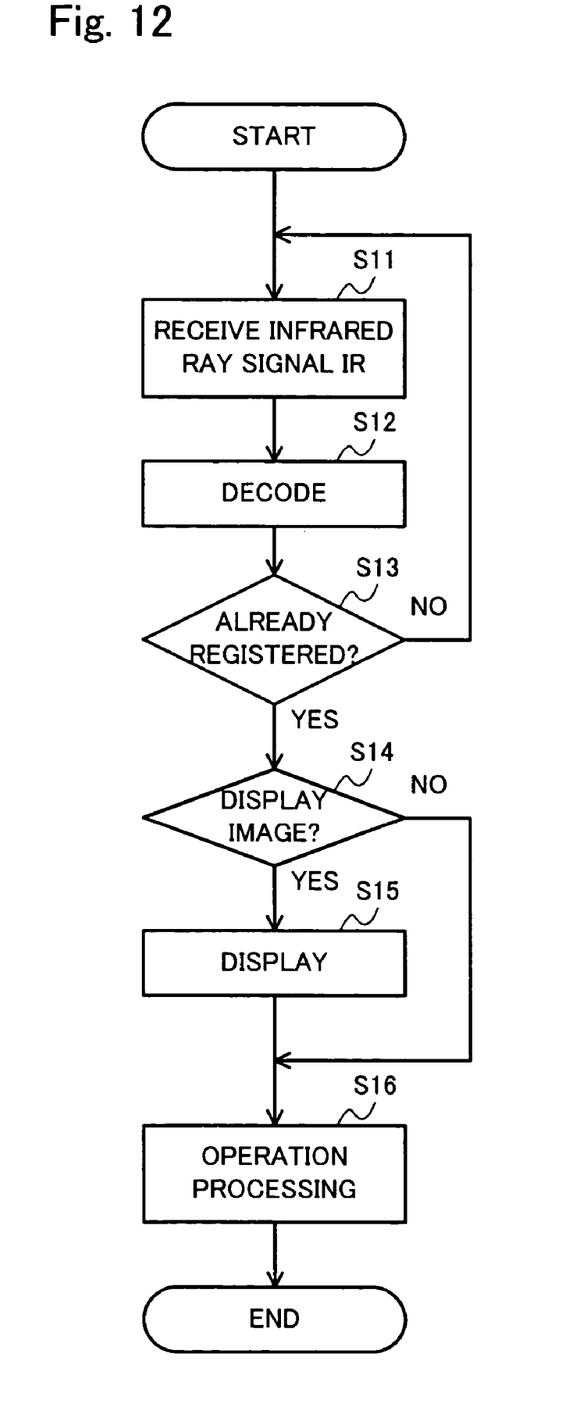
FIG. 12 is a flowchart for use in illustration of remote control operation processing in the remote control system shown in FIG. 1.

Referring to FIG. 12, when the sensor 22 in the receiver 20 receives an infrared ray signal IR (S11), the decoder 21 transmits a decoded remote code RC to the computer 10 (S12). The computer 10 receives the remote code RC, and determines whether or not the remote code RC has been registered in the registration table (S13). As the result of determination, if the remote code RC has not been registered, the process returns to step S11.

When the received remote code RC is "ABCD99" in Table 1, the computer 10 determines that the received remote code RC is registered in the registration table under the registration ID=3 (S13). The computer 10 determines whether or not "1" is in the display column for the registration ID=3 (S14). Since "1" is in the display column, the computer 10 displays the message "raise volume" at the display 13 (S15). When "0" is in the display column, no message is displayed.

In step S15, after the message is displayed at the display 13, the computer 10 increases the volume of the music reproducing program (the identifier of the activated music program: Music PLAYER) recorded in the file name column. "1" is in the continuation information column for the registration ID=3 and therefore the computer 10 continues to increase the volume as long as the sensor 22 receives the infrared ray signal IR (as long as the user continues to press the button of the remote controller 30).

By the above operation, the remote control system 1 according to the embodiment can control the operation of program installed in the computer 10 using the remote controller for TV or audio equipment.

In addition, when there is a remote controller dedicated to the music reproduction program, the remote controller can also be used to operate another program. Therefore, the user can easily operate a plurality of programs installed in the computer 10 using the single remote controller.

Furthermore, the remote control can be set to the channel buttons of the remote controller for TV so that a web page for the program guide of a channel can be viewed. As a result, when a channel button in the remote controller for TV is pressed, the TV screen image is displayed while the web page for the channel program guide can be viewed at the display 13 for the computer 10.

Note that according to the embodiment, a remote control program is installed in the computer 10, but a remote control program may be installed in program-installable AV equipment rather than in the computer 10.

According to the embodiment, the operation content of the program corresponding to the remote code RC is selected among the operation contents recorded in the pre-setting operation table, the file operation table, and the shortcut key operation table, but if the operation content of the mouse is registered in any of the operation tables, the operation of the mouse displayed at the display can be controlled as well using the remote controller. Different kinds of operations can be registered for a single remote code RC among when the user presses an operation button in the remote controller 30 only once, when the user presses it twice and when the user continues to press the button at least for a prescribed time period. In short, the operation to be registered can be changed depending on how the operation button in the remote controller 30 is pressed.

Furthermore, the computer 10 is provided with an infrared ray transmission device, so that home electronic equipment such as an air conditioner, TV and audio equipment can be controlled through the computer 10 using the remote controller.

The embodiment of the invention is described simply by way of illustrating the present invention. Therefore, the invention is not limited to the embodiment described above and the embodiment may be modified as required without departing from the scope of the invention.

What is claimed is:

1. A remote control system for carrying out remote control setting processing and remote control operation processing, comprising:

a registration table storage device storing a registration table;

a receiver receiving a signal from a remote controller and decoding the signal to a remote code during the remote control setting processing and the remote control operation processing;

a remote code determiner determining whether or not the remote code obtained by said receiver has been registered in the registration table during the remote control setting processing;

a first register registering a first selected operation of a program corresponding to the remote code obtained by said receiver in the registration table when said remote code determiner determines that the obtained remote code has not been registered in the registration table;

a registration determiner determining whether or not a second selected operation of a program should be registered corresponding to the obtained remote code when said remote code determiner determines that the obtained remote code has been registered in the registration table;

a second register reqistering the second selected operation of the program corresponding to the obtained remote code in the registration table when said registration determiner determines that the second selected operation of the program should be registered corresponding to the obtained remote code;

an execution determiner determining whether or not the remote code obtained by said receiver has been registered in the registration table during the remote control operation processing; and an executor executing the first selected operation or the first and second selected operations of the program corresponding to the obtained remote code in the registration table when said execution determiner determines the obtained remote code has been registered in the registration table.

2. The remote control system according to claim 1, further comprising:

an operation table having a plurality of operations of the program and a plurality of operation identifiers corresponding to said plurality of operations of the program; and wherein said first and second register each include:

an identifier selector selecting the operation identifier corresponding to the first or second selected operation of the program from said operation table; and an identifier register registering the obtained remote code corresponding to the selected operation identifier in said registration table.

3. The remote control system according to claim 1, wherein said first and second register each include:

a resource identifier identifying one of data resources; and
a resource register registering the obtained remote code and the identified data resource corresponding to the obtained remote code in the registration table, and
said executor opens the data resource corresponding to the obtained remote code using the program.

4. The remote control system according to claim 1, further comprising:
an operation table having a plurality of input operations and a plurality of operation identifiers corresponding to said plurality of input operations, and
wherein said first and second register each include:
a program selector selecting one of programs;
an obtainer obtaining an input operation from an input device,
an identifier determiner determining the operation identifier corresponding to the obtained input operation in said operation table; and
an identifier register registering the selected program and the determined operation identifier in the registration table.

5. The remote control system according to claims 1, wherein said first register registers a message corresponding to the obtained remote code in the registration table,
said remote control system further comprising a display displaying the message corresponding to the obtained remote code when said executor executes the first selected operation of the program corresponding to the obtained remote code.

6. The remote control system according to claim 1, wherein said first register registers continuation information corresponding to the first selected operation of the program in the registration table, the continuation information indicating whether or not to continue to execute the first selected operation of the program, and
when said continuation information indicates the continuous execution, while said receiver receives the signal, said executor continues to execute the first selected operation of the program corresponding to the obtained remote code.

7. A remote control program product stored on a computer readable media and executable by a computer with a receiver receiving a signal from a remote controller and decoding the signal to a remote code during remote control setting processing and remote control operation processing, said program product allowing said computer to carry out the steps of:
determining whether or not the remote code obtained by the receiver has been registered in the registration table during the remote control setting processing;
registering a first selected operation of a program installed in the computer corresponding to the remote code obtained by the receiver in a registration table;
determining whether or not a second selected operation of a program should be registered corresponding to the obtained remote code upon determining that the obtained remote code has been registered in the registration table;
registering the second selected operation of the program corresponding to the obtained remote code in the registration table upon determining that the second selected operation of the program should be registered corresponding to the obtained remote code;
determining whether or not the remote code obtained by the receiver has been registered in the registration table during the remote control operation processing; and
executing the first operation or the first and the second operations of the computer program corresponding to the obtained remote code when the obtained remote code has been registered in the registration table.

8. The remote control program product according to claim 7, wherein said computer includes an operation table having a plurality of operations of the program and a plurality of operation identifiers corresponding to said plurality of operations of the program, and
the steps of registering each include the steps of:
selecting the operation identifier corresponding to the first or second selected operation of the program from said operation table; and
registering the obtained remote code corresponding to the selected operation identifier in the registration table.

9. The remote control program product according to claim 7, wherein the steps of registering each include the steps of:
identifying one of data resources; and
registering the obtained remote code and the identified data resource corresponding to the obtained remote code in the registration table, and
the step of executing includes the step of opening the data resources corresponding to the obtained remote code using the program.

10. The remote control program product according to claim 7, wherein said computer includes an operation table having a plurality of input operations and a plurality of operation identifiers corresponding to said plurality of input operations, and
the steps of registering each include the steps of:
selecting one of programs;
obtaining an input operation from an input device;
determining the operation identifier corresponding to the obtained input operation in said operation table; and
registering the selected program and the determined operation identifier in the registration table.

11. The remote control program product according to claim 7, wherein the step of registering the first selected operation of the program registers a message corresponding to the obtained remote code in the registration table, and
said remote control program product allows said computer to carry out the step of displaying the message corresponding to the obtained remote code when the step of executing executes the first selected operation of the program.

12. The remote control program product according to claim 7, wherein the step of registering the first selected operation of the program registers continuation information corresponding to the first operation of the program in the registration table, the continuation information indicating whether or not to continue to execute the first selected operation of the program, and
when said continuation information indicates the continuous execution, while said receiver receives the signal, the step of executing continues to execute the first selected operation of the program corresponding to the obtained remote code.

* * * * *